United States Patent [19]
Wheeler

[11] 4,027,625
[45] June 7, 1977

[54] PET COMMODE

[76] Inventor: David C. Wheeler, 240 Tower Road, Barrington, Ill. 60010

[22] Filed: May 14, 1975

[21] Appl. No.: 572,481

[52] U.S. Cl. .................................................. 119/1
[51] Int. Cl.² ........................................... A01K 29/00
[58] Field of Search ............. 119/1; 220/63 R, 4 C, 220/23, 17, 1 T, 90; 229/14 B, 14 R; 217/3 R, 3 BC; 4/110, 142

[56] References Cited

UNITED STATES PATENTS

| | | | |
|---|---|---|---|
| 2,741,223 | 4/1956 | Winborn, Jr. | 119/1 |
| 3,100,474 | 8/1963 | Schneider | 119/1 |
| 3,476,083 | 11/1969 | Vander Wall | 119/1 |
| 3,723,999 | 4/1973 | Miller | 4/142 |
| 3,757,990 | 9/1973 | Buth | 220/63 R |
| 3,796,188 | 3/1974 | Bradstreet | 119/1 |
| 3,831,557 | 8/1974 | Elesh | 119/1 |
| 3,890,930 | 6/1975 | Clark | 119/1 |
| 3,908,597 | 9/1975 | Taylor | 119/1 |

Primary Examiner—Louis G. Mancene
Assistant Examiner—Peter K. Skiff
Attorney, Agent, or Firm—Bernard L. Kleinke

[57] ABSTRACT

A commode for use by pets is adapted to contain litter material and includes an opened mouth rigid base having a disposable container, such as a plastic bag, nested within the hollow interior of the base, the base supporting from below an opened mouth box containing the litter material. A closure in the form of a slidable tray supports the litter material from below and is adapted to close a lower opening in the box, the closure being movable to an open position to enable used litter material to fall under the force of gravity through the lower opening and into the disposable container. When the closure is moved to its closed position, it effectively seals the open disposable container within the base so that the used litter material may be stored therein for relatively long periods of time. The lower opening in the box is substantially smaller in size than the mouth of the disposable container, and in one embodiment of the invention, the box includes inner and outer walls with the inner walls sloping inwardly and terminating in the lower opening. A wiping blade removes used litter material from the closure as it is moved to its open position and serves to retain the litter material within the box.

10 Claims, 4 Drawing Figures

U.S. Patent   June 7, 1977   4,027,625
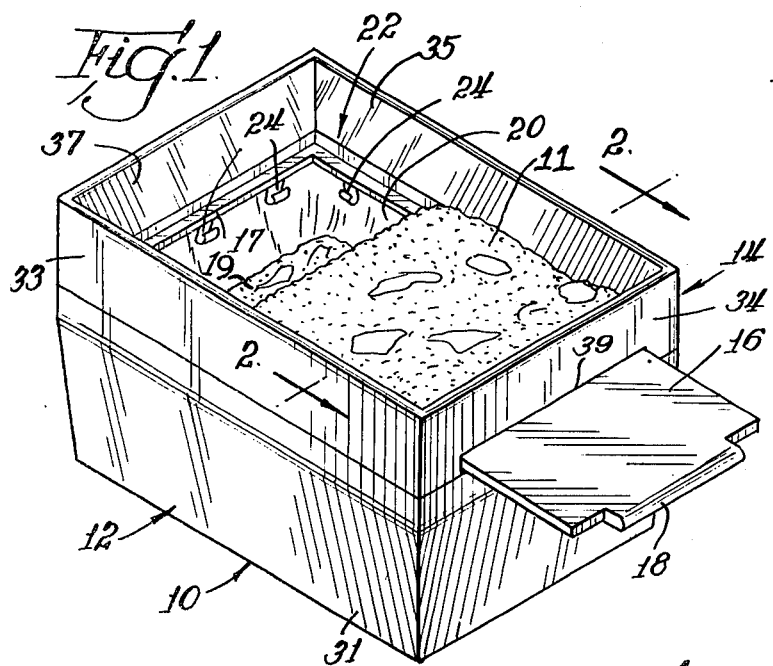
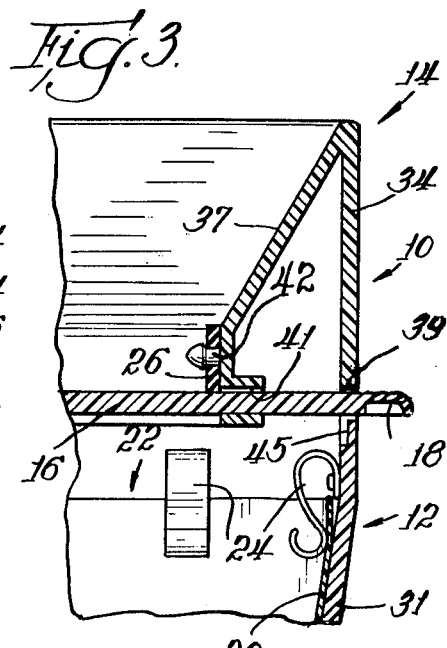
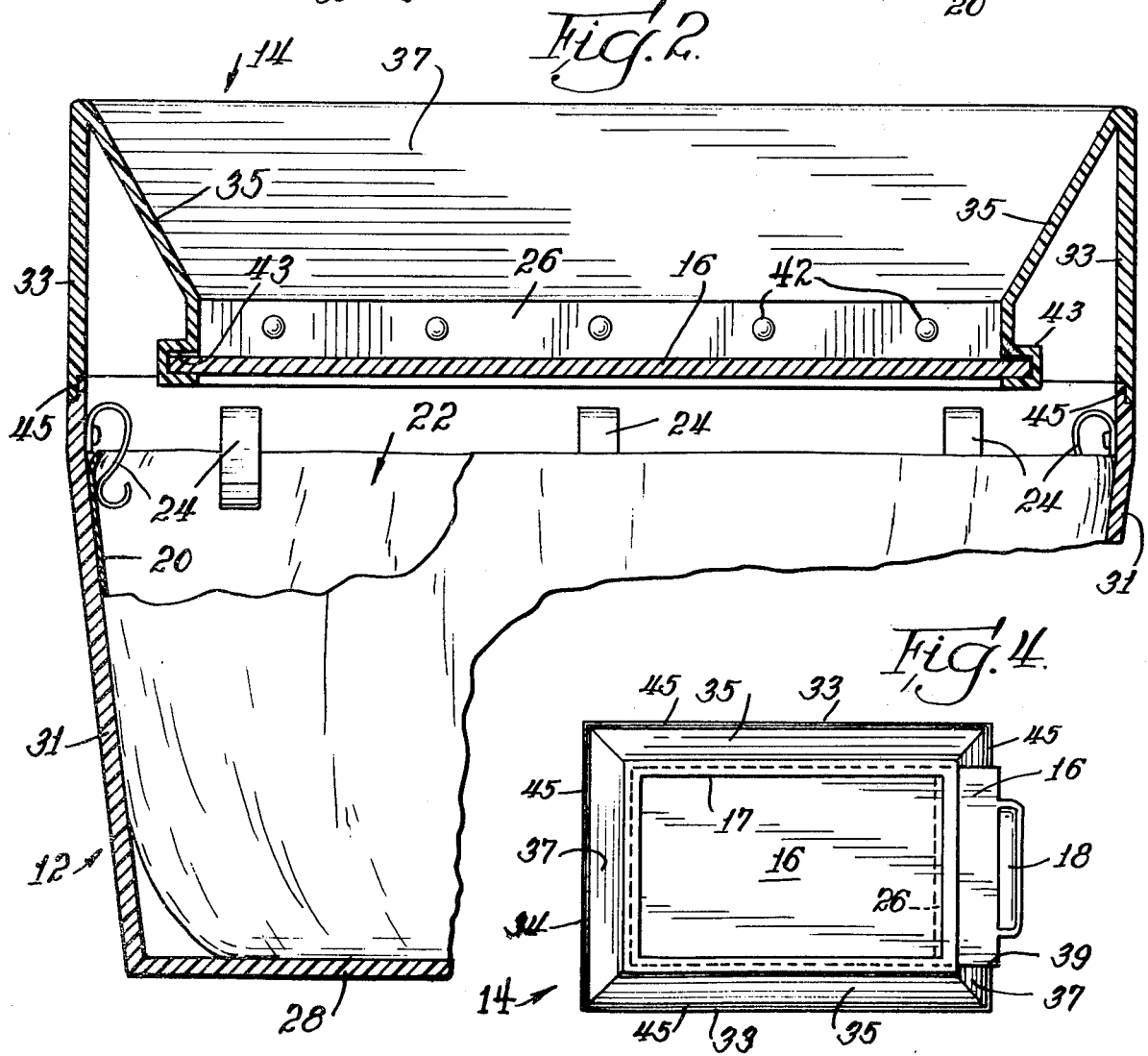

PET COMMODE

The present invention relates to a commode for use by pets, and it more particularly relates to a pet commode which is readily and conveniently cleaned.

Various different devices and containers have been used as commodes for pets, and many of them have been arranged to facilitate cleaning operations. For example, reference may be made to the following U.S. Pat. Nos. 3,100,474; 3,227,137; 3,621,817; 3,735,735; and 3,796,188. All of the apparatus shown and described in those patents may be satisfactory for some applications, but none of them disclose a pet commode which can store used litter material for relatively long intervals of time without disposing of it. In this regard, pet commodes ordinarily are cleaned at relatively short intervals of time, and such a cleaning operation is distasteful and should be performed ideally as little as possible. The apparatus shown in the patents is difficult to clean since some of the patented devices include screens or grids which are very difficult and time consuming to clean. Therefore, it would be highly desirable to have a pet commode which is relatively easy to clean, and which needs little attention for relatively long periods of time as compared to conventional pet commodes.

Therefore, the principal object of the present invention is to provide a new and improved pet commode, which is easy to clean and which requires little attention for relatively long periods of time.

Briefly, the above and further objects are realized in accordance with the present invention by providing a pet commode which includes a disposable container nested within a hollow interior of a base, and an opened mouth box disposed on top of the base for containing litter material. A closure is movably mounted on the box to close a lower opening therein and for supporting the litter material so that the closure may be moved to an open position to enable used litter material to fall under the force of gravity through the lower opening in the box and into the disposable container. A wiping blade removes used litter material from the closure when it is moved to its open position. The box includes inner and outer walls with the inner walls sloping inwardly and terminating in the lower opening. The lower opening is substantially smaller in size than the mouth of the disposable container to facilitate the guiding of the used litter material into the disposable container within the base.

The invention, both as to its organization and method of operation, together with further objects and advantages thereof, will best be understood by reference to the following detailed description taken in connection with the accompanying sheet of drawings, wherein:

FIG. 1 is a pictorial view of the pet commode which is constructed in accordance with the present invention showing the closure in a partially open position;

FIG. 2 is an enlarged fragmentary cross-sectional view of the pet commode of FIG. 1 taken substantially along the line 2—2 thereof;

FIG. 3 is an enlarged fragmentary vertical cross-sectional view of the pet commode of FIG. 1 showing the closure disposed in its closed position; and FIG. 4 is a bottom view of the upper box of the pet commode of FIG. 1, showing the box removed from the base with the closure disposed in its closed position.

Referring now to the drawings, and more particularly to FIG. 1 thereof, there is shown a pet commode 10, which is constructed in accordance with the present invention, and which is adapted to store litter material 11 for use by pets. The pet commode 10 generally comprises an opened-top base 12 supporting an upper box or container 14, which includes a closure or tray 16 slidably mounted over a lower mouth 17 of the box 14 for supporting animal litter material 11 thereon. A handle 18 on the tray 16 enables a person to pull the tray 16 laterally to an open position so that the used litter material 19 (FIG. 1) may be pushed over the rear edge of the tray 16 and permit it to fall under the force of gravity through the lower mouth 17 into a disposable container, such as the plastic bag 20, disposed in the base 12, the tray 16 being illustrated in a partially open position in FIG. 1 of the drawings. An open mouth 22 (FIG. 2) of the bag 20 is maintained in an open position by a plurality of spring clips 24 so that the used litter material 19 readily falls into the bag 20. A wiper blade 26 engages the upper surface of the tray 16 to retain the litter material within the box 14 as the tray 16 is pulled to an open position, whereby the tray disposed on the outside of the box 14 as shown in FIG. 1 is always maintained free of any litter material. After the used litter material 19 is pushed into the disposable container 20, the tray 16 is slid into its closed position to close the lower mouth 17 to seal the base 12 and thus the bag 20, whereby the used litter material can be stored successfully in an odor-free manner for relatively long periods of time before the bag 20 is removed from the base 12 and discarded. When the tray 16 is returned to its closed position, fresh litter material may be added to the bed of material 11 resting on top of the tray 16. In order to remove the filled bag 20, the box 14 is lifted off of the top edge of the base 12 to permit access to the bag 20.

Considering now the base 12 in greater detail with reference to FIGS. 1 and 2 of the drawings, the base 12 includes a bottom wall 28 for supporting the bag 20 thereon, and four side walls 31. The base 12 is generally rectangular in cross section, but it is to be understood by those skilled in the art that various different shapes and sizes may be employed. Also, a decorative outer shell may also be employed, such, for example, as a wicker basket (not shown). As seen in FIG. 2, the side walls 31 are tapered or inclined inwardly from the upper portions thereof to the bottom wall 28. The base 12 may be composed of any suitable rigid material, such as plastic material.

Considering now the upper box 14 in greater detail with reference to the drawings, the box 14 is generally rectangular in cross section and is of the same cross-sectional area as the base 12. The upper box 14 rests on the base 12 and provides a continuous smooth outer contour to provide the appearance that the box 14 and the base 12 are of a single unitary construction. The upper box 14 includes a pair of outer side walls 33 and a pair of outer end walls 34 to form a rectangular-shaped box with the closure 16 forming the bottom wall of the box when the closure is in its closed position as indicated in FIG. 4 of the drawings. A pair of oppositely-disposed inwardly sloping inner side walls 35 are joined with a pair of oppositely-disposed inner end walls 37, the inner end walls terminating in the lower mouth 17. The sloping inner side walls serve the purpose of maintaining the litter material within the confines of the box 14 and also serve to guide the litter material through the lower mouth 17 when the tray 16 is pulled to its open position as indicated in FIG. 1 of the drawings.

As best seen in FIG. 3 of the drawings, an opening 39 in the front outer end wall 34 receives the tray 16, which extends through an aligned opening 41 in the innermost vertical sloping portion of the front inner end wall 37 serving to define the front portion of the lower mouth 17 of the box 14. The wiper blade 26 is fixed removably to the same portion of the front inner end wall 37 as the opening 41 to doctor the litter material from the tray 16 and to seal off the opening 41 to prevent any of the litter material from being carried by the tray 16 as it moves outwardly into its open position. A series of enlarged-headed short rods 42 extending from a vertical portion of the wall 37 extend through openings in the blade 26 to secure removably the blade 26 to the wall 37, so that the blade 26 may be detached from the box 14 for ease of cleaning.

As best seen in FIG. 2 of the drawings, the inner side walls terminate at the lower mouth 17 in a pair of oppositely-disposed C-shaped side tracks 43 for slidably receiving the tray 16. The rear inner end wall 37 may also terminate in a similar C-shaped track to receive the rear edge of the tray 16 when it is disposed in its closed position as indicated in FIG. 4 of the drawings. However, it is to be understood by those skilled in the art that the rear inner end wall 37 does not need to have such a track construction but instead merely have an opening similar to the opening 41 in the front inner end wall 37.

As best seen in FIG. 2 of the drawings, the upper edges of the vertical side walls 31 of the base 12 interengage with the lower edges of the vertical side end walls 33 and 34 of the box 14 as generally indicated at 45. Thus, the upper box 14 merely rests on the lower box 12 to facilitate the removal of the box 14 to permit access to the bag 20. Also, the interengaging of the box 14 with the base 12 as generally indicated at 45 helps to seal the box to its base. The interengaging edges 45 are in the form of a shiplap joint.

The height of the base 12 should be between about one and one-half to four times the height of the box 14 so that the base provides adequate storage space for used litter material and yet the base should not be too high to make it difficult for a small animal, such as a cat, to leap up into the box 14 to use it as a commode.

More particularly, the height of the base should be approximately between one and one-half to two and one-half times the height of the box. Still more particularly, the height of the base should be approximately two times the height of the box so that both the box and the base have sufficient space to serve their intended purposes.

In accordance with the present invention, the lower mouth 17 of the box 14 is smaller than the open mouth of the bag 20 so that the used litter material falls readily within the bag 20. The box 14 is generally rectangular in shape, but it should be understood that other shapes of the lower mouth 17 will be suitable as long as the mouth 17 is smaller in size than the disposable container 20.

The bag 20 is composed of filmy plastic material and is generally rectangular in cross section to fit conveniently within the base 12.

In use, the tray 16 is positioned in its closed position as indicated in FIG. 4, and litter material 11 is then placed on the upper surface of the tray 16. As a result, small animals, such as cats, can jump into the box 14 and use it as a commode. After sufficient use in this manner, the used litter material may be temporarily disposed of by grasping the handle 18 and sliding the tray 16 to a partially open position as indicated in FIG. 1 of the drawings or to a full open position to enable a portion or all of the litter material 11 to be pushed with a tool (not shown), such as a small rake, to the open portion of the lower mouth 17 to fall therethrough under the force of gravity into the bag 20 in the base 12. Thereafter, the tray 16 may be slid to its closed position and fresh litter material may be added to the top of the tray 16. This cycle of operation may be repeated until the bag 20 is filled. The bag 20 may be removed by removing the box 14 from the base 12 by grasping the box and lifting it up and off of the top edge of the base. The filled bag may then be removed from the base 12 by slipping the mouth of the bag from under the clips 24 and then the bag may be disposed of in a permanent manner after lifting it out of the opened-top base 12. A new bag may be placed in the base 12 on the bottom wall 28 thereof. The mouth of the bag is then slipped under the clips 24 to maintain the mouth of the bag in an open position. Thereafter, the box 14 is placed on top of the base 12 and fresh litter material added to the box 14 so that the cycle may be repeated.

The outer side walls 33 and 34 of the box 14 are integrally connected to the corresponding inner side walls 35 and 37 at the upper portions thereof. The tracks 43 are integrally joined to the lower portions of the inner side walls 35 as shown in FIG. 2 of the drawings. The litter material 11 disposed on top of the tray 16 helps to seal the tray to the box 14 to help prevent odors from escaping from the base 12.

The foregoing description is considered as being only illustrative of the principles of the present invention. Numerous modifications and changes within the true spirit and scope of the present invention will be readily apparent to those skilled in the art. For example, a rigid container may be employed in place of the filmy plastic bag 20. Therefore, it is not intended to limit the invention to the exact construction and operation shown and described. Accordingly, all suitable modifications may be resorted to only as limited by the scope and the breadth of the following claims.

What is claimed is:

1. A commode for pets adapted to contain a litter material, comprising:
    an opened mouth rigid base having a hollow interior;
    an opened mouth box disposed on top of said base and having a lower normally closed opening, said lower opening being substantially smaller in size than said mouth of said base; and
    said box includes inner and outer walls, said outer wall being supported by said base, said inner wall being connected to said outer wall and sloping downwardly and inwardly and terminating in said lower opening, mounting means disposed at said lower opening for supporting a closure, said closure movably mounted on said box for supporting the litter material and for normally closing and sealing said lower opening, said closure being movable to an open position to enable used litter material to fall under the force of gravity through said lower opening and into said base.

2. A commode according to claim 1, further including wiping means for removing used litter material from said closure.

3. A commode according to claim 1, wherein said closure includes a tray, said mounting means for mounting slidably said tray to move laterally between an open position and a normally closed litter material-supporting position over said lower opening said outer wall having an opening therein for receiving said tray when it moves to said open position.

4. A commode according to claim 3, further including a wiping blade connected to said inner wall and extending transversely across and in engagement with said tray for cleaning it when it is moved to its open position.

5. A commode according to claim 1, wherein said inner walls terminate at said opening in mounting means, said mounting means including a pair of oppositely-disposed tracks for slidably supporting said closure.

6. A commode according to claim 1, wherein said inner walls slope upwardly from said tracks and are integrally connected to the upper edges of said outer walls.

7. A commode according to claim 1, further including a disposable container nested within said hollow interior of said base and having an open mouth facing upwardly.

8. A commode according to claim 7, wherein said lower opening being substantially smaller in size than the mouth of said disposable container.

9. A commode according to claim 7, wherein said disposable container includes a filmy plastic bag, further including means for maintaining said mouth of said disposable container in an open position within said base.

10. A commode according to claim 9, wherein said means includes spring clips mounted on said base.

* * * * *